Dec. 1, 1931.   M. R. TREMBOUR ET AL   1,834,750
PROCESS FOR MANUFACTURING JAILBAR STEEL INGOTS
Filed April 18, 1930
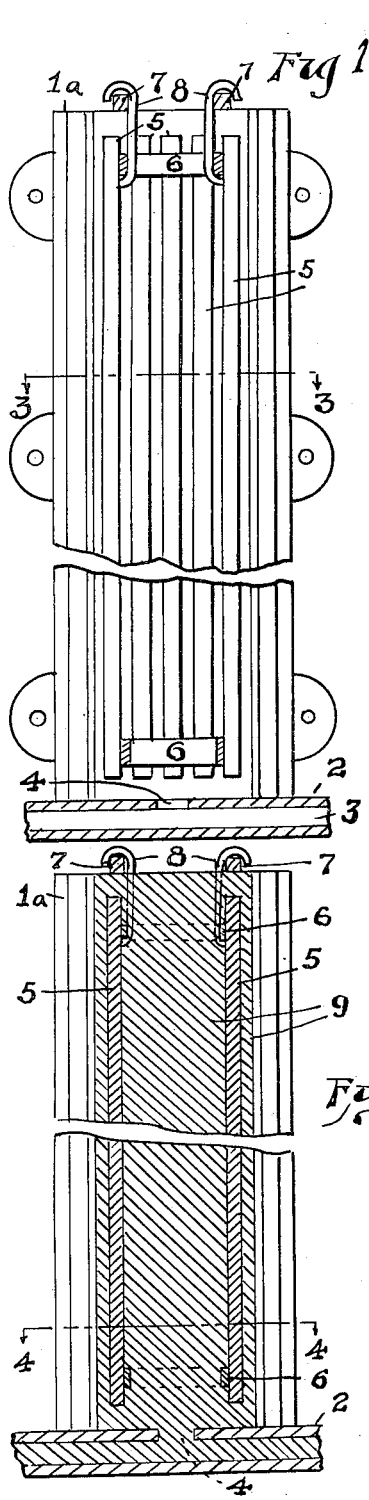
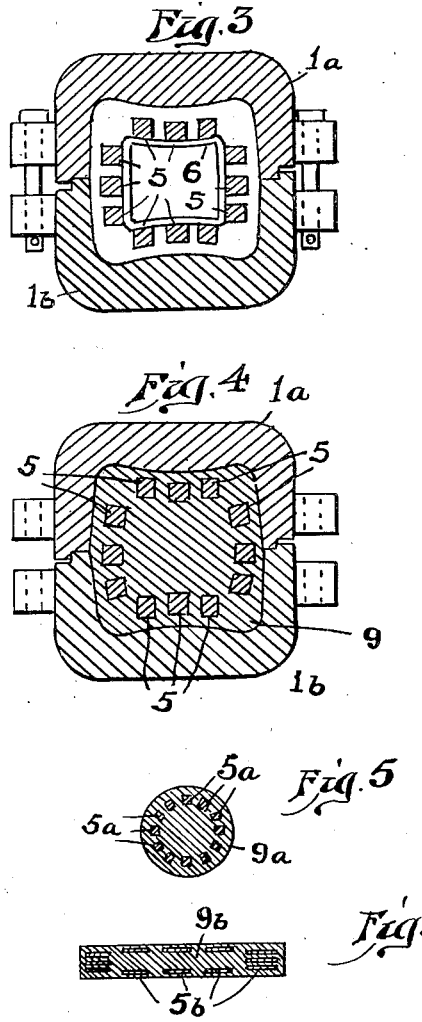
INVENTORS,
Max R. Trembour
and John A. Auth
by Edward A. Lawrence
their attorney.

Patented Dec. 1, 1931

1,834,750

UNITED STATES PATENT OFFICE

MAX R. TREMBOUR, OF BEAVER BOROUGH, AND JOHN A. AUTH, OF MOON TOWNSHIP, BEAVER COUNTY, PENNSYLVANIA, ASSIGNORS TO COLONIAL STEEL COMPANY, OF PITTSBURGH, PENNSYLVANIA, A CORPORATION OF PENNSYLVANIA

PROCESS FOR MANUFACTURING JAILBAR STEEL INGOTS

Application filed April 18, 1930. Serial No. 445,398.

Jailbar steel is used in detention institutions, such as jails and prisons, and also for the protection of banks and other depositaries of valuables, and the like.

To adequately serve such purposes the bars or plates must be difficult to break or shatter as by the blows of a sledge hammer and must also be difficult to cut as by a file or saw.

Thus jailbar steel is characterized by a body of relatively soft steel, which cannot be readily shattered or broken, and inserts of relatively hard steel which cannot be readily cut.

The relative positioning of the hard steel inserts in the soft steel body is a feature of the greatest importance but difficult to accomplish.

It is necessary to place the inserts as near as possible to the surface so that the cutting of the soft steel to a material extent may be prevented. Otherwise the soft steel body might be cut or notched and the inserts shattered or broken by a blow at the notched portion. Again, if the inserts be placed directly at the surface of the soft steel they may be first shattered and the soft steel then cut through. Again this placement of the inserts presents practically insurmountable difficulties in manufacturing due to cracking of the ingot.

Again inserts which are relatively positioned in an improper manner are exposed to individual attack and may be cut through one at a time.

One of the characteristic features of our invention is a jailbar whose inserts are placed near but not at the surface of the soft steel so that no material cutting of the latter may be accomplished without encountering and attacking the inserts, and also whose inserts are relatively positioned in such manner that they cannot be attacked and cut one at a time.

The casting of a jailbar ingot is a difficult operation owing to the number of inserts which must be incorporated in the ingot and near the outer surfaces of the latter, and which must be uniformly covered and inclosed by the soft steel.

We have therefore invented a new and improved process for producing such ingots.

One of the characteristic features of our improved process is the bottom-casting of the soft steel into a vertically disposed mold.

We first assemble the hard steel inserts into rigid relationship with each other, forming what might be termed a cage, a support, such as a steel ring being welded or otherwise secured to each end of the inserts so as to hold them in proper position in the mold. The rings are of soft steel similar to the soft steel which is to form the body of the ingot.

The cage thus formed is then inserted downwardly into the mold and suspended from above therein. The ends of the cage stop short of the upper and lower ends of the mold so that the ends of the inserts are entirely covered by the molten soft steel.

The ingot is then removed from the mold and rolled or worked to final form in the usual manner.

In the accompanying drawings, wherein we have illustrated a practical embodiment of the principles of our invention, Fig. 1 is an elevation of one-half of a split ingot mold with the cage of inserts suspended therein, the cage being shown in vertical section.

Fig. 2 is a similar but broken view showing the soft metal body cast in the mold.

Fig. 3 is a cross-sectional view taken along the line 3—3 in Fig. 1.

Fig. 4 is a similar view taken along the line 4—4 in Fig. 2.

Fig. 5 is a cross-sectional view of a round jailbar rolled from the ingot shown in Figs. 2 and 4.

Fig. 6 is a cross-sectional view of a plate rolled from the ingot illustrated in Figs. 2 and 4.

Referring to the drawings, 1a and 1b represent the two parts of a vertical "split" ingot mold mounted on a base 2 which is provided with a channel 3 and port 4 for the bottom-casting of the molten metal into the mold.

5 represents the hard steel inserts which may be and preferably are of chrome-manganese alloy. The bars are of proper cross-sectional area to provide the proper area in the finished jailbar, such as shown in Fig. 5.

The bars 5 are assembled and secured together in proper relation before they are inserted into the mold.

Thus we may and preferably do weld the bars adjacent to their upper and lower ends to the rings 6 which are of soft steel similar to the soft steel which is to be poured into the mold 1a—1b. These rings 6 are on the inside with the inserts welded or otherwise secured to the outer perimeter of the rings. The rings are preferably provided with flat surfaces against which the inserts are welded.

The ingots are usually cast with a substantially square or rectangular cross-sectional shape and thus the rings are of the proper shape to properly position the inserts relative to the body of soft metal in which the inserts are to be enveloped.

The cage thus formed of hard steel inserts and soft steel rings is suspended from above in the otherwise empty ingot mold with the lower end of the cage spaced above the bottom of the mold and the upper end of the cage below the top of the mold.

In practice we suspend the cage in place by means of steel struts or bars 7 placed on top of the mold, and steel hooks 8 whose upper ends are hooked over the bars 7 and whose lower ends are hooked over the top ring 6. Four of such hooks 8 may be used, two suspended from each strut 7.

The soft metal 9, which is usually low carbon steel, is then bottom-cast in the mold and filled up to the top of the mold or above the upper end of the inserts 5. The soft metal envelope covers the lower end of the inserts and also covers the upper ends of the inserts to a sufficient degree to permit the pipes to be cut off the upper end of the ingot without cutting the inserts.

When the ingot has hardened, the split mold is opened and the ingot removed, and it is then worked in the usual manner to final form, such for instance as illustrated in Fig. 5 wherein the reduced inserts are shown at 5a and the soft steel body at 9a. In the working the material of the rings 6 becomes incorporated in the like steel of the body 9a.

The positioning of the inserts 5 relative to the soft steel body 9 of the ingot is of the greatest importance. We have illustrated our improved arrangement and it will be there noted that in the finished bars these inserts are placed near but not at the surface of the soft steel body, so that no material cutting of the soft steel can be accomplished before the file, saw of other cutting tool encounters one or more of the inserts. Again the soft steel cannot be notched sufficiently to allow the inserts to be shattered by a blow.

It will be noted that the inserts are sufficiently numerous and are so placed relative to each other that no one insert may be separately attacked. In other words before one insert can be materially cut into the tool will encounter another insert or inserts, thus rendering the attempt to sever the inserts practically abortive.

In Fig. 6 we have illustrated the ingot rolled out into the form of a flat bar or plate, the soft steel body being indicated at 9b and the inserts at 5b.

We claim:—

1. The process of manufacturing jailbar ingots which comprises assembling a plurality of hard steel inserts into a cage, having its center open throughout its length, by securing the inserts to the outer perimetrical surfaces of rings of soft steel, suspending said cake in a vertical position in a vertically disposed mold with the inserts out of contact with the wall of the mold, and casting the mold full of soft steel.

2. The process of manufacturing jailbar ingots which comprises assembling a plurality of hard steel inserts into a cage, having its center open throughout its length, by securing the inserts to the outer perimetrical surfaces of rings of soft steel, suspending said cage in a vertical position in a vertically disposed mold with the inserts out of contact with the wall of the mold and the ends of the inserts being spaced within the top and bottom of the mold, and casting the mold full of soft steel, the soft steel covering both ends of the inserts.

Signed at Monaca, Pa., this 15th day of April, 1930.

MAX R. TREMBOUR.
JOHN A. AUTH.